(12) United States Patent
Wawrzynowski

(10) Patent No.: US 9,556,570 B1
(45) Date of Patent: Jan. 31, 2017

(54) DEVICE FOR PICKING UP ANIMAL WASTE

(71) Applicant: Michael Wawrzynowski, Rancho Dominguez, CA (US)

(72) Inventor: Michael Wawrzynowski, Rancho Dominguez, CA (US)

( * ) Notice: Subject to any disclaimer, the term of this patent is extended or adjusted under 35 U.S.C. 154(b) by 0 days.

(21) Appl. No.: 14/863,450

(22) Filed: Sep. 24, 2015

(51) Int. Cl.
*A01K 29/00* (2006.01)
*E01H 1/12* (2006.01)
*A01K 1/01* (2006.01)

(52) U.S. Cl.
CPC ............. *E01H 1/1206* (2013.01); *A01K 1/01* (2013.01); *E01H 2001/1226* (2013.01); *E01H 2001/1286* (2013.01)

(58) Field of Classification Search
CPC ..................... E01H 1/1206; A01K 23/005
USPC ... 294/1.3, 1.4, 1.5, 176, 177, 99, 99.2, 104; 119/161; D30/161, 621
See application file for complete search history.

(56) References Cited

U.S. PATENT DOCUMENTS

| | | | | |
|---|---|---|---|---|
| 3,653,392 A * | 4/1972 | Hassey | ............... | A45D 6/145 132/252 |
| 3,703,158 A * | 11/1972 | Lemler | ............... | E01H 1/1206 294/1.3 |
| 5,054,226 A * | 10/1991 | Hart | ............... | A01K 97/18 294/16 |
| 5,385,376 A * | 1/1995 | Malaspina | ............ | E01H 1/1206 15/257.6 |
| 5,564,763 A * | 10/1996 | Mercurio | .............. | E01H 1/1206 294/1.3 |
| 5,669,645 A * | 9/1997 | Chuang | ................. | E01H 1/1206 294/1.3 |
| 7,216,905 B1 * | 5/2007 | Armes, Jr. | ............ | E01H 1/1206 294/1.3 |
| 7,523,972 B1 * | 4/2009 | Wawrzynowski | .... | E01H 1/1206 294/1.3 |
| 7,909,375 B2 * | 3/2011 | Waldman | ............... | A47G 21/10 294/16 |
| 8,292,338 B1 * | 10/2012 | Baghdasaryan | ...... | E01H 1/1206 294/1.3 |
| D756,572 S * | 5/2016 | Baker | ......................... | D30/162 |
| 2009/0261603 A1 * | 10/2009 | Boghozian | ............ | E01H 1/1206 294/1.3 |

* cited by examiner

*Primary Examiner* — Paul T Chin

(57) ABSTRACT

A device for picking up animal waste is described that use a waste bag. The pick-up device includes a first concave body and a second concave body that form a waste collection cavity. A hinge along a fixed edge allows a movable edge to move between an open position and a closed position. A spring biases the device into the closed position. An activation mechanism is provided to overcome the biasing force of the spring. Waste bag retainers retainer the waste bag within the waste collection cavity.

4 Claims, 8 Drawing Sheets

SECTION B-B

SECTION E-E

SECTION C-C

SECTION D-D

DETAIL F

DETAIL G

DEVICE FOR PICKING UP ANIMAL WASTE

FIELD

There is described a device for picking up animal waste that uses plastic bags.

BACKGROUND

A number of devices have been developed for picking up animal waste, such as: U.S. Pat. No. 3,733,098 (Tobias), U.S. Pat. No. 3,738,697 (Kahan), U.S. Pat. No. 3,841,686 (Gallo), U.S. Pat. No. 4,225,174 (Hennessy), U.S. Pat. No. 4,247,139 (Greib), U.S. Pat. No. 4,248,468 (Hastings), U.S. Pat. No. 4,951,987 (Lebeau) and U.S. Pat. No. 7,695,035 (Sumner).

Some of these devices can be used with plastic bags, such as: U.S. Pat. No. 4,273,370 (Kjaer), U.S. Pat. No. 4,323,272 (Fortier), and U.S. Pat. No. 5,476,296 (Gross).

SUMMARY

There is provided a device for picking up animal waste, comprising in combination a waste bag and a pick-up device. The waste bag used with the device includes a plastic body having an open top, enclosed sides and a bottom. An attachment strip is positioned along the bottom of the waste bag. The pick-up device includes a first concave body and a second concave body. Each of the first concave body and the second concave body has an exterior surface and an interior surface. They are positioned such that the interior surface of the first concave body and the interior surface of the second concave body collectively forming a waste collection cavity. Each of the first concave body and the second concave body have a fixed edge and a movable edge which is opposed to the fixed edge. A hinge is positioned along the fixed edge of the first concave body and the second concave body. The hinge forms a pivot axis allowing relative movement of the first concave body and the second concave between an open position and a closed position. In the open position the movable edge of the first concave body is spaced from the movable edge of the second concave body to permit access to the waste collection cavity. A spring biases the first concave body and the second concave body into the closed position. An activation mechanism is provided for overcoming the biasing force of the spring to move the first concave body and the second concave body to the open position. At least one waste bag retainer is provided on one of the first concave body or the second concave body adjacent to the hinge. The waste bag is positioned within the waste collection cavity with the waste bag retainer engaging the attachment strip at the bottom of the waste bag. The open top of the waste bag is then folded back over the exterior surface of the first concave body and the second concave body.

The combination described above enables a person to pick up animal waste deposited on the ground by their dog or cat. The waste bag may then be disposed of.

It is preferred that the waste bag retainers be positioned on the exterior surface adjacent to the fixed edge of one of the first concave body or the second concave body. It is also preferred that there be two retainers positioned in spaced relation with a first of the two waste bag retainers being positioned beyond a first end of the hinge and a second of the two waste bag retainers being positioned beyond the second end of the hinge.

There are a variety of waste bag retainer configurations that are capable of working. It is preferred that the waste bag retainers being posts positioned in spaced relation and that the attachment strip at the bottom of the waste bag have post receiving openings.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
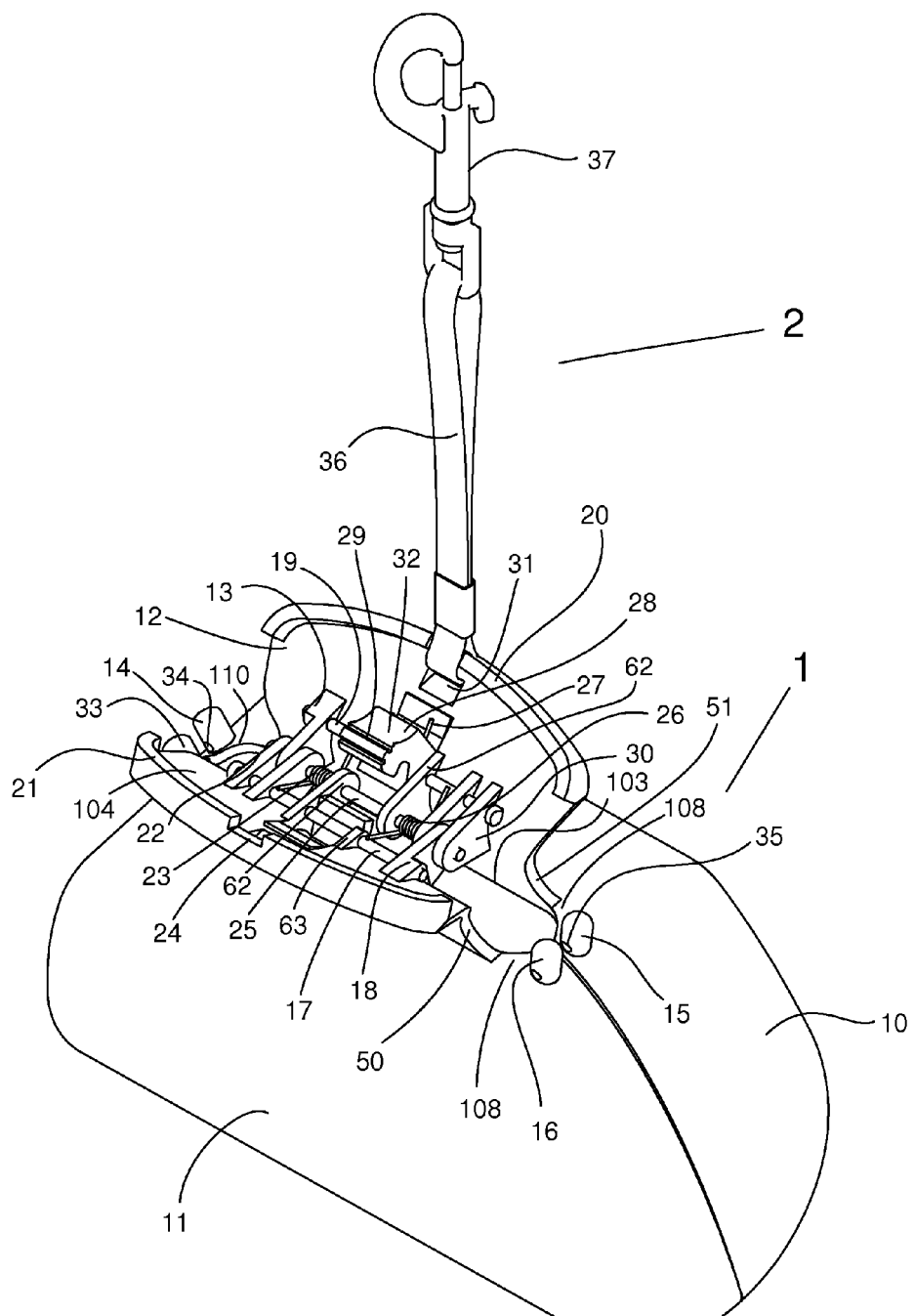
FIG. 1 is a perspective view of a device for picking up animal waste in a closed position.

A device for picking up animal waste generally identified by reference numeral 1, will now be described with reference to FIG. 1 through 18.

Figure 2:
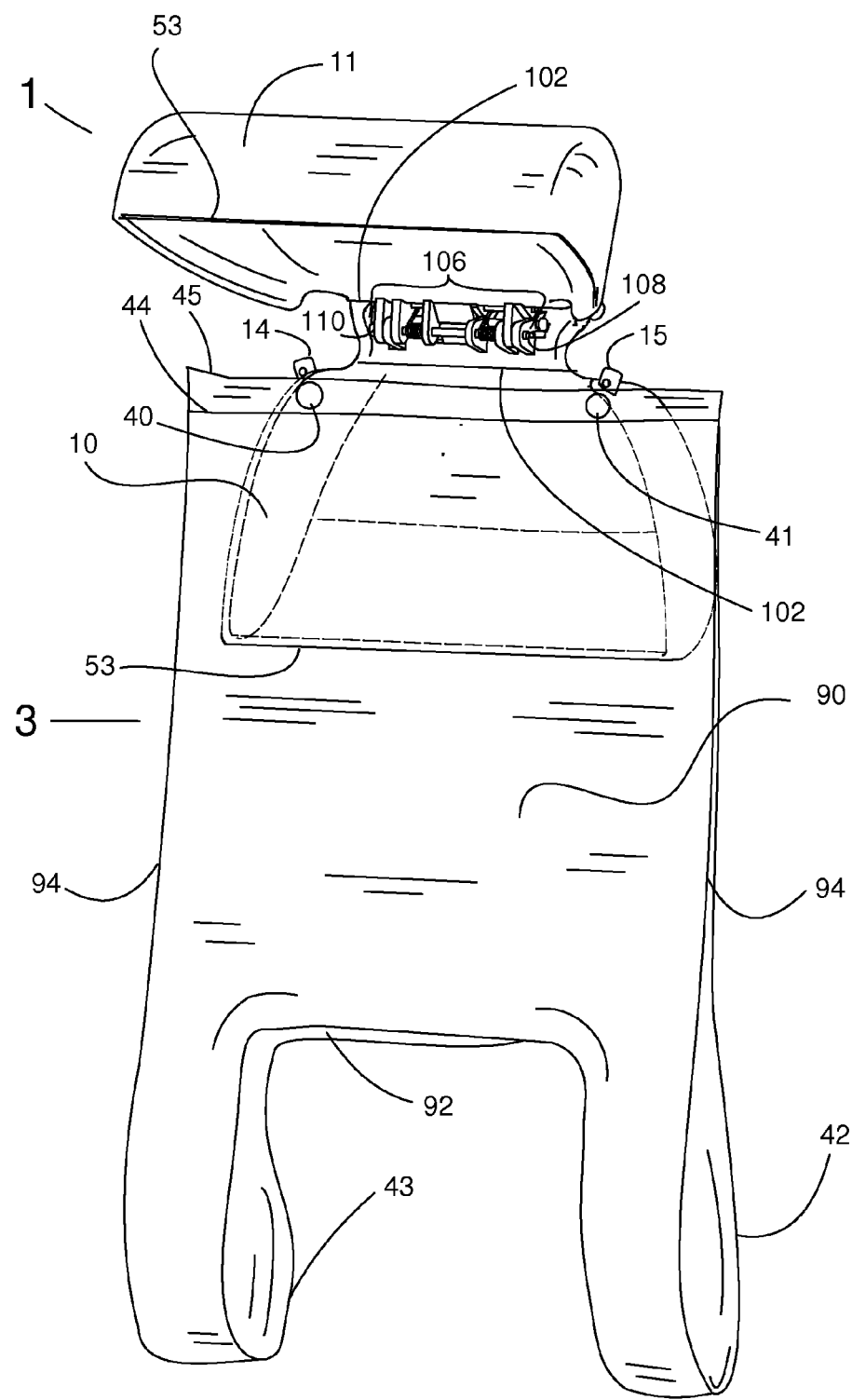
FIG. 2 is a perspective view of the device of FIG. 1, locked in an open position with a waste bag ready to install.

Structure and Relationship of Parts:

Referring to FIG. 2, device 1 works in combination with a waste bag 3. Waste bag 3 has a plastic body 90 with an open top 92, enclosed sides 94 and a bottom 44. An attachment strip 45 is positioned along bottom 44 of waste bag 3. Waste bag 3 has handles in the form of a first side ear 42 and a second side ear 43. Positioned along attachment strip 45 are a first hole 40 and a second hole 41, which are used to secure waste bag 3 to device 1, as will be hereinafter further described. It is to be noted that first hole 40 and second hole 41 are on attachment strip 45 and do not puncture or create an opening in body 90 of waste bag 3, where animal waste is to be collected.

Figure 14:
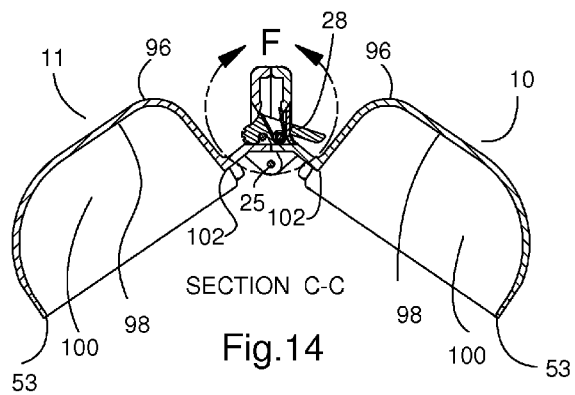
FIG. 14 is a cross-sectional view of the device taken along section lines C-C of FIG. 13.
Figure 15:
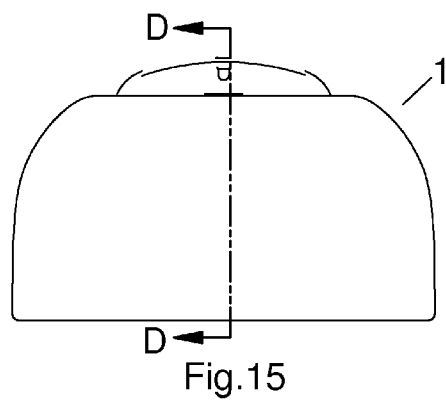
FIG. 15 is a front view of the device of FIG. 1, in an unlocked, partly open position.
Figure 16:
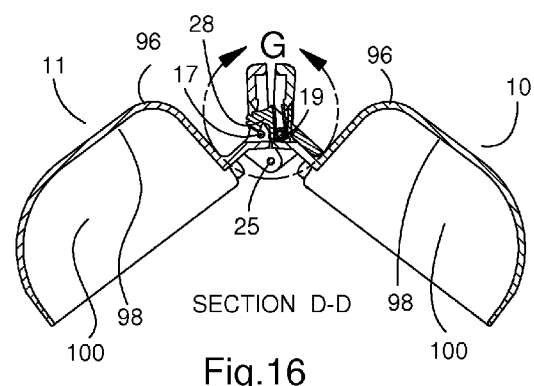
FIG. 16 is a cross-sectional view of the device taken along section lines D-D of FIG. 15.

Referring to FIG. 14 and FIG. 16, device 1 includes a first concave body 10 and a second concave body 11. Each of first concave body 10 and second concave body 11 has an exterior 96 surface and an interior surface 98. They are positioned such that interior surface 98 of first concave body 10 and interior surface 98 of second concave body 11 collectively form a waste collection cavity 100. Each of first concave body 10 and second concave body have a fixed edge 102 and a movable edge 53 which is opposed to fixed edge 102. A hinge assembly, generally indicated by reference numeral 106, is positioned along fixed edge 102 of first concave body 10 and second concave body 11. Hinge assembly 106 connects first concave body 10 and second concave body 11, with center pivot pin 25 of hinge assembly 106 serving as a pivot axis which allows relative movement of first concave body 10 and second concave body 11 between an open position (as shown in FIG. 2, FIG. 6, FIG. 7, FIG. 14 and FIG. 16) and a closed position (as shown in FIG. 1, FIG. 3, FIG. 4, FIG. 5, FIG. 8 through FIG. 10). Referring to FIG. 6, FIG. 7, FIG. 14 and FIG. 16, in the open position movable edge 53 of first concave body 10 is spaced from movable edge 53 of second concave body 11 to permit access to waste collection cavity 100.

Referring to FIG. 1, hinge assembly 106 have a first end 108 and a second end 110. Hinge assembly 106 includes a pivot bracket 30 and an extended pivot bracket 13 on first concave body 10 and a pivot bracket 22 and an extended pivot bracket 18 on second concave body 11. Extended pivot bracket 13 on first concave body 10 engages pivot bracket 22 on second concave body 11 and are maintained in engagement by center pivot pin 25. Extended pivot bracket 18 on second concave body 11 engages pivot bracket 30 on first concave body 10 and are also maintained in engagement by center pivot pin 25. A first torsional spring 23 and a second torsional spring 26 serve to bias first concave body 10 and second concave body 11 into the closed position.

Figure 7:
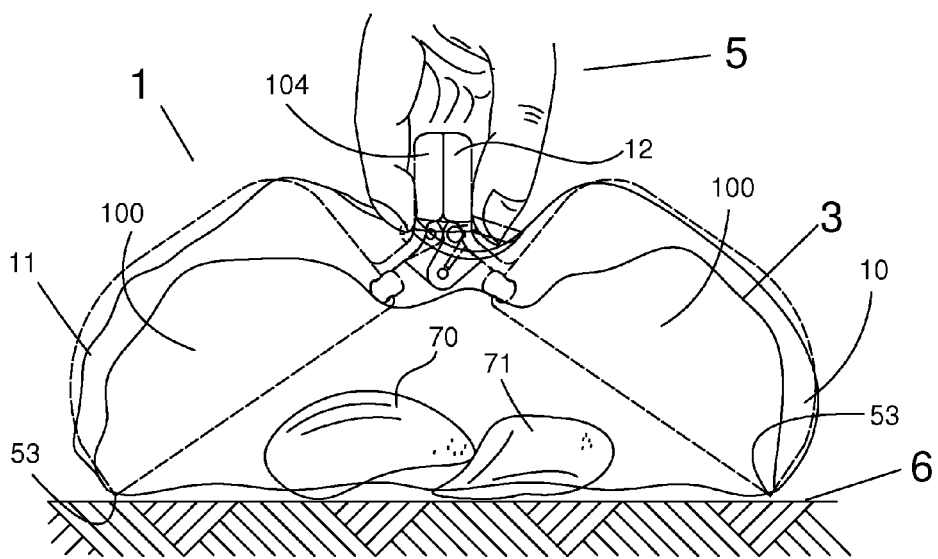
FIG. 7 is a side elevation view of the device of FIG. 6, locked in the open position ready to pick-up animal waste.
Figure 8:
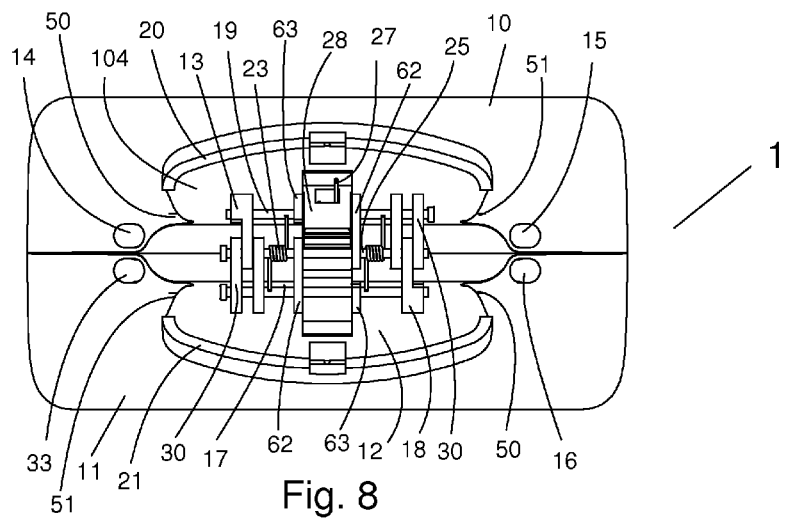
FIG. 8 is a top plan view of the device of FIG. 7, in a closed position.
Figure 9:
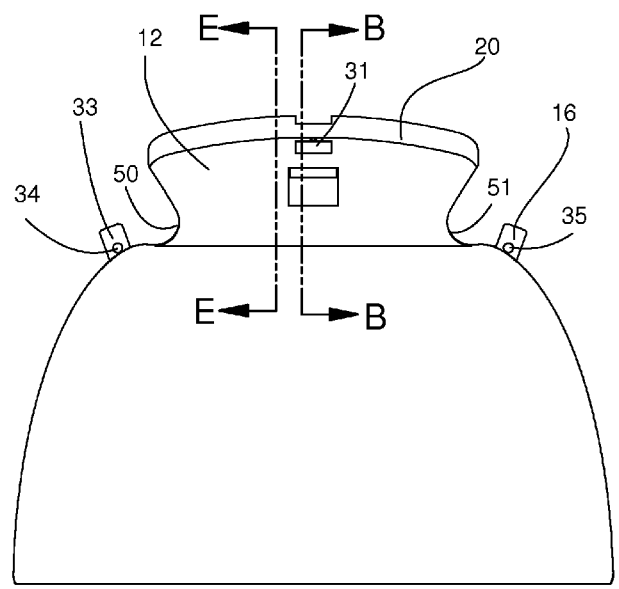
FIG. 9 is a front elevation view of the device of FIG. 8.
Figure 10:
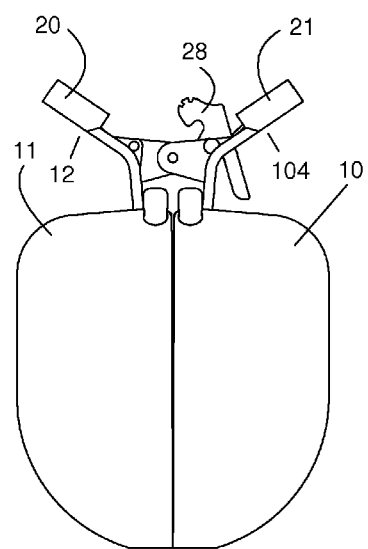
FIG. 10 is a side elevation view of the device of FIG. 8.
Figure 11:
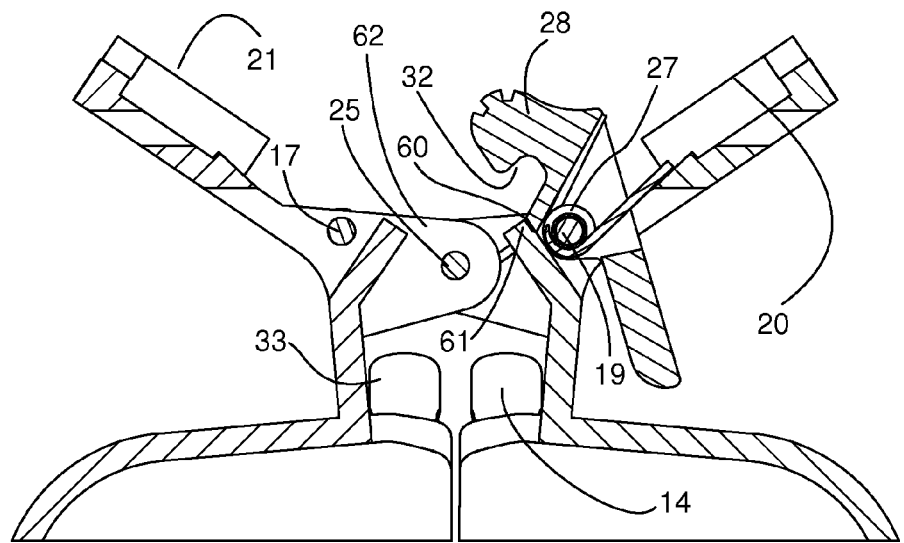
FIG. 11 is a cross sectional view taken along section lines B-B of FIG. 9, showing details of locking mechanism in unlock position
Figure 12:
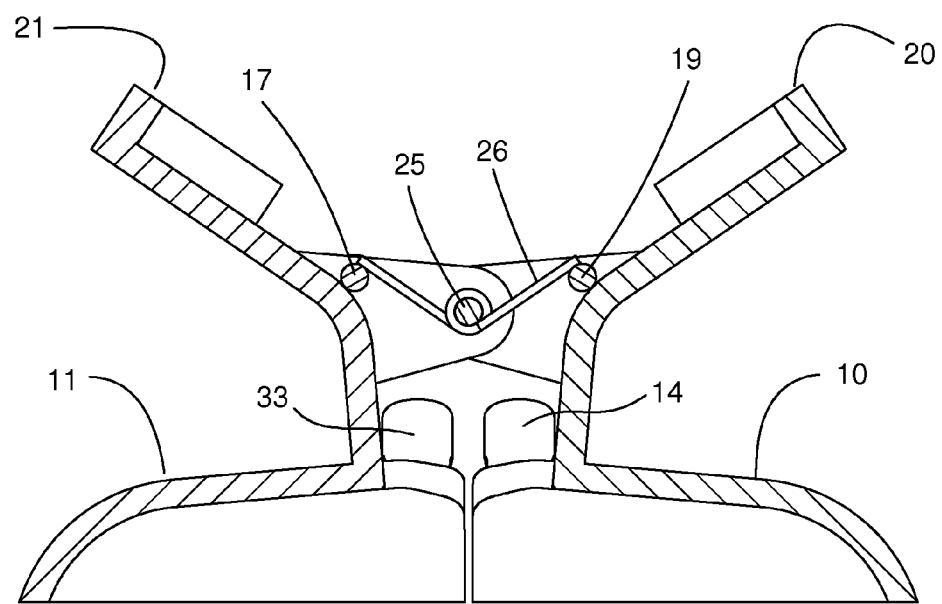
FIG. 12 is a cross sectional view taken along section lines E-E of FIG. 9, showing torsional spring used to keep halves is closed position.
Figure 13:
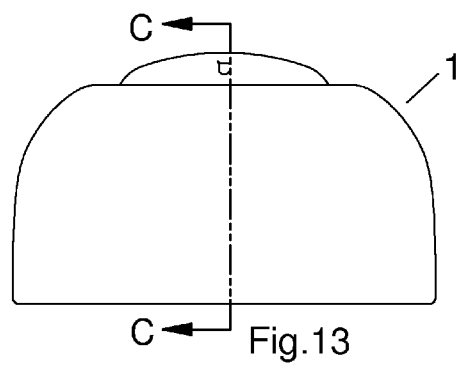
FIG. 13 is a front view of the device of FIG. 1, in locked in an open position.

Referring to FIG. 1 and FIG. 7, a first handle 12 on first concave body 10 and a second handle 104 on second concave body 11 serves as an activation mechanism for overcoming the biasing force of first torsional spring 23 and second torsional spring 26 to pivot first concave body 10 and second concave body 11 about center pivot pin 25 to the open position. First handle 12 has a first capping ridge 20 and second handle 104 has a second capping ridge 21. Referring to FIG. 9, both first handle 12 and second handle 104 have a first concave side 50 and an opposed second concave side 51. First concave side 50 and second concave side 51 are used to engage and retain first side ear 42 and a second side ear 43 of waste bag 3, as will be hereinafter further explained.

Referring to FIG. 1, waste bag retainers in the form of posts are provided on device 1. Each of first concave body 10 and second concave body 11 have two posts on exterior surface 96 adjacent to fixed edge 102. On first concave body 10, a left hooking post 14 is positioned beyond first end 108 of hinge assembly 106 and a right hooking post is positioned beyond second end 110 of hinge assembly 106. On second concave body 11, a left hooking post 33 is positioned beyond first end 108 of hinge assembly 106 and a right hooking post 16 is positioned beyond second end 110 of hinge assembly 106. Referring to FIG. 1 and FIG. 9, a first hole 34 extends transversely through left hooking post 14 of first concave body 10 and left hooking post 33 of second concave body 11. Referring to FIG. 1 and FIG. 9, a second hole 35 extends transversely through right hooking post 15 of first concave body 10 and right hooking post 16 of second concave body 11. First hole 34 and second hole 35 are not intended to serve a function during use. They are used to mount device 1 on a cardboard hanger board which is used for retail packaging. Conceivably, they could be used after purchase to receive cotter pins or similar locking hardware to prevent waste bag 3 from being accidently released from one of the hooking posts. However, it is to be noted that any such hardware might interfere with pivotal movement due to space limitations. It is preferred that left hooking post 14 of first concave body 10 and left hooking post 33 of second concave body 11 be tilted away from each other. It is similarly preferred that right hooking post 15 of first concave body 10 and right hooking post 16 of second concave body 11 be tilted away from each other. This facilitates installation by stretching first hole 40 to concurrently engage both left hooking post 14 of first concave body 10 and left hooking post 33 of second concave body 11, while similarly stretching second hole 41 to concurrently engage both right hooking post 15 of first concave body 10 and right hooking post 16 of second concave body 11. The stretching of the material of attachment strip 45 around first hole 40 and second hole 41, together with the slight tilting of the hooking posts away from each other serves to secure waste bag 3.

Referring to FIG. 1, it is preferred that a carrying strap and leash hooking attachment be provided, as is generally indicated by reference numeral 2. Leash hooking attachment 2 has a strap 36 extends through a socket 31 in first handle 12 and wraps around first capping ridge 20. A clasp 27 is positioned on strap 36. Clasp 27 enables device 1 to be connected to a leash (not shown).

Figure 17:
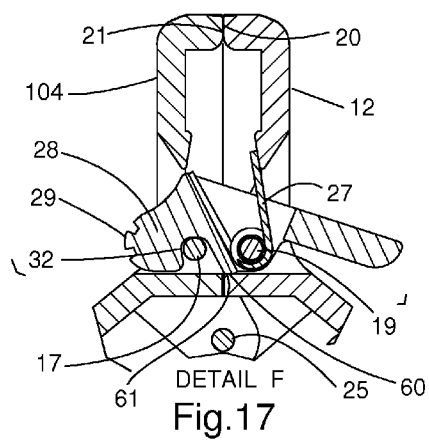
FIG. 17 is an enlarged detail cross-sectional view of portion F of FIG. 14, showing locking mechanism in locked position.
Figure 18:
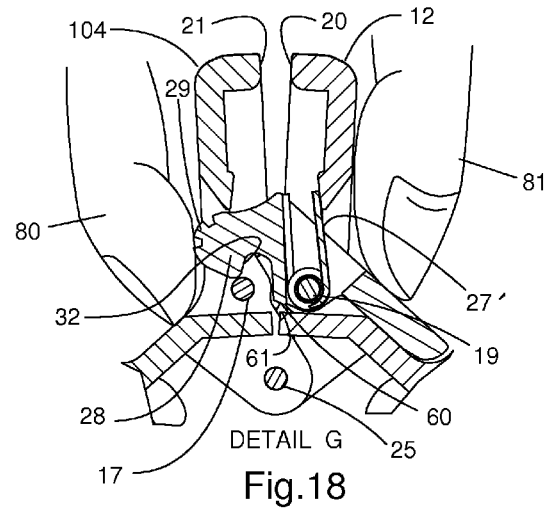
FIG. 18 is an enlarged detailed cross-sectional view of portion G of FIG. 16, showing locking mechanism unlocked and partly open position.

Referring to FIG. 14 and FIG. 17, when device 1 is in the open position first handle 12 and second handle 104 are brought together until first capping ridge 20 on first handle 12 comes in contact with second capping ridge 21 on second handle 104. To relieve the user from having to continually exert manual pressure to overcome the biasing force of first torsion spring 23 and second torsion spring 26, a locking mechanism is provided as illustrated in FIG. 1, FIG. 10, FIG. 13 through FIG. 18. Referring to FIG. 17 and FIG. 18, the locking mechanism includes a locking pin 17, a locking finger 28 that has a latch 32 that engages locking pin 17 and a locking finger pivot pin 19 about which locking finger 28 pivots between an engaged position engaged with locking pin 17 as illustrated in FIG. 17 and a disengaged position in which locking finger 28 is disengaged from locking pin 17 as illustrated in FIG. 18. A locking finger spring 27 is provided to maintain locking finger 28 engaged with locking pin 17 until a force is manually exerted by index finger 80 and thumb 81. Latch 32 of locking finger 28 has ribs 29, which help prevent slippage of index finger 80 when a person is using thumb 81 to exert a pivoting force on locking finger 28 to overcome the biasing force of locking finger spring 27 and index finger 80 to pull latch 32 out of engagement with locking pin 17. In order to avoid excessive pressure upon either locking pin 17 or locking finger pivot pin 19, a finger seat 61 is provided upon which locking finger 28 is seated when in the engaged position shown in FIG. 17 and a finger rest 60 is provided upon which locking finger 28 rests when in the disengaged position. Referring to FIG. 1, locking pin 17 is held by a first bracket 62 and locking finger pivot pin 19 is supported by a second bracket 63.

Operation:

The use of device 1 will now be described with reference to FIG. 1 through FIG. 18. Referring to FIG. 14 and FIG. 17, device 1 is prepared for use by pinching together first handle 12 and second handle 104 until first capping ridge 20 and second capping ridge 21 come into contact. Locking finger 28 is then moved into an engaged position where latch 32 has engaged locking pin 17. Latch 32 will be maintained in this engaged position by the biasing force provided by locking finger spring 27.

Referring to FIG. 2, with device 1 in the open position, waste bag 3 is inserted into waste collection cavity 100 placing first hole 40 and second hole 41 on attachment strip 45 at bottom 44 of waste bag 3 over left hooking post 14 and right hooking post 15 of concave body 10. It will be appreciated that waste bag 3, could alternatively be attached to left hooking post 33 and a right hooking post 16 of second concave body 11. It will further be appreciated that as a further alternative first hole 40 may be stretched to concurrently engage both left hooking post 14 of first concave body 10 and left hooking post 33 of second concave body 11, while second hole 41 is stretched to concurrently engage both right hooking post 15 of first concave body 10 and right hooking post 16 of second concave body 11.

Figure 3:
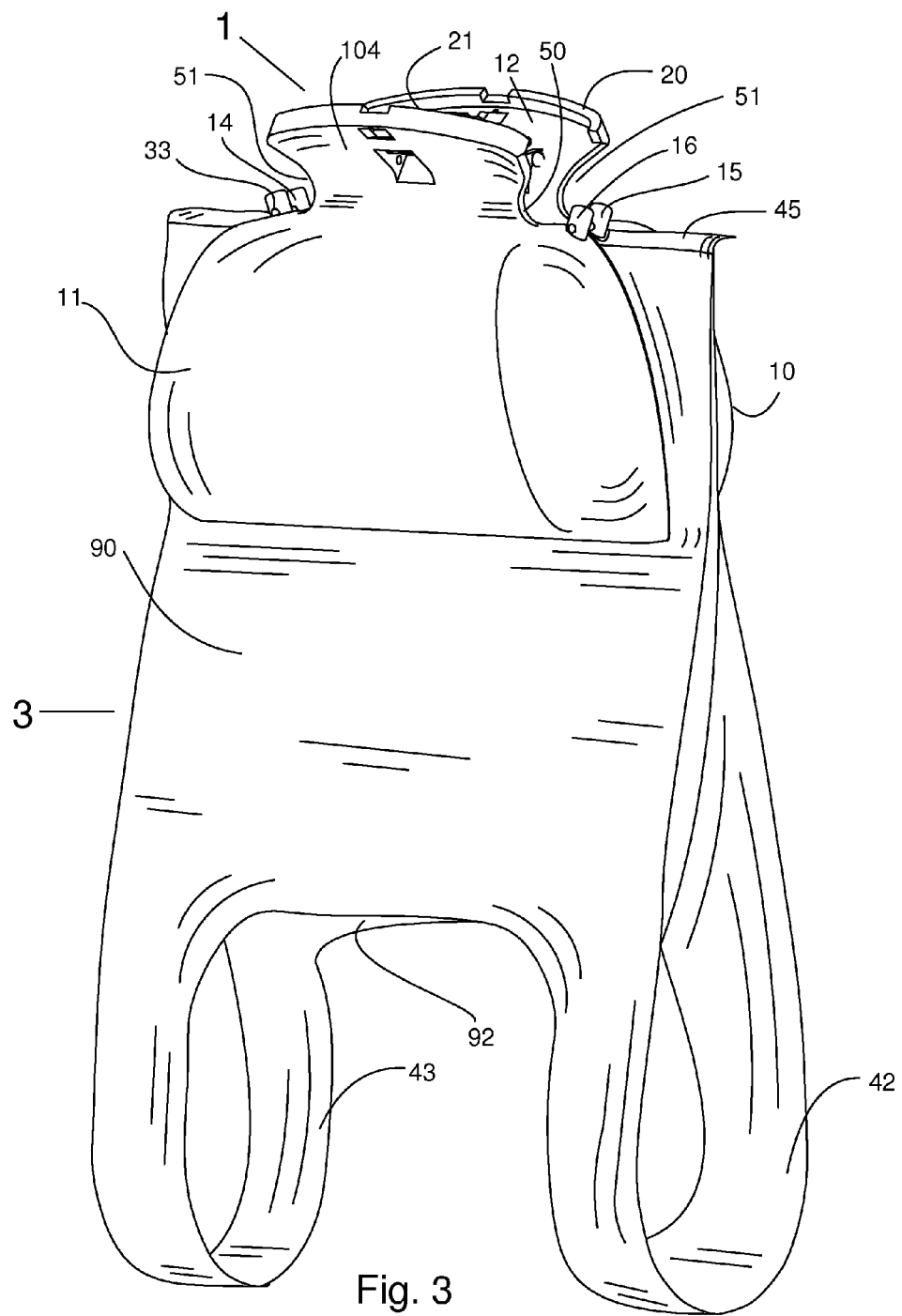
FIG. 3 is a perspective view of the device of FIG. 2, in a closed position with the waste bag attached.

Referring to FIG. 3, device 1 is then moved to the closed position, trapping waste bag 3 within waste collection cavity 100. Referring to FIG. 16 and FIG. 18, in order to release the locking mechanism to permit device 1 to be moved from being locked in the open position to the closed position, a person is uses their thumb 81 to exert a pivoting force on locking finger 28 to overcome the biasing force of locking finger spring 27. At the same time, the person engages rib 29 on latch 32 and uses their index finger 80 to pull latch 32 out of engagement with locking pin 17.

Figure 4:
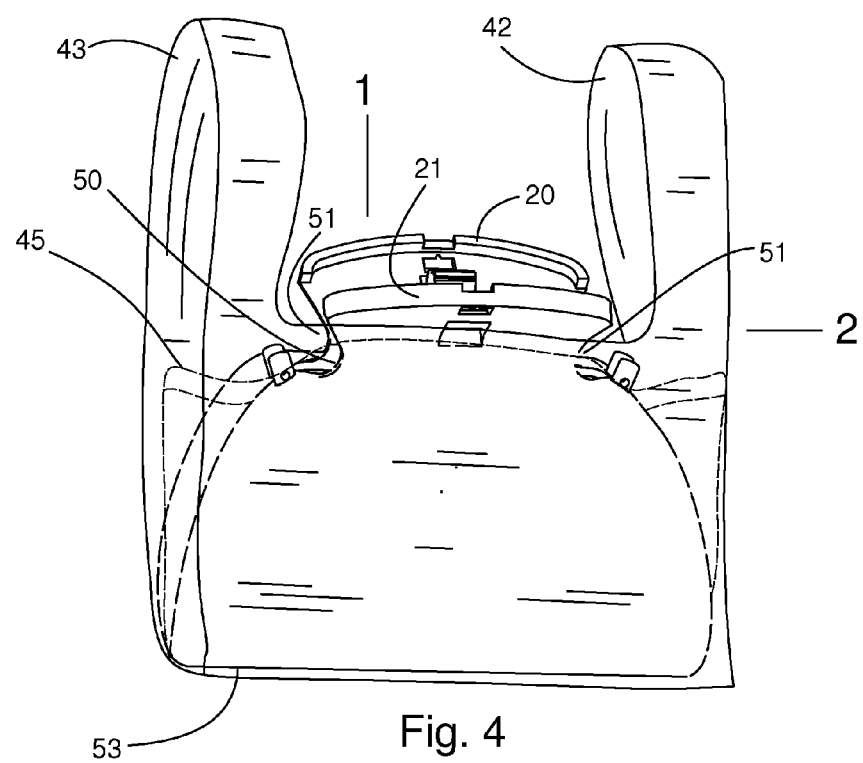
FIG. 4 is a front elevation view of the device of FIG. 3, with the bag folded back over the exterior surface of the device.

Referring to FIG. 4, open top 92 of waste bag 3 is folded back along movable edge 53 and drawn up over exterior surface 96 of first concave body 10 and second concave body 11.

Figure 5:
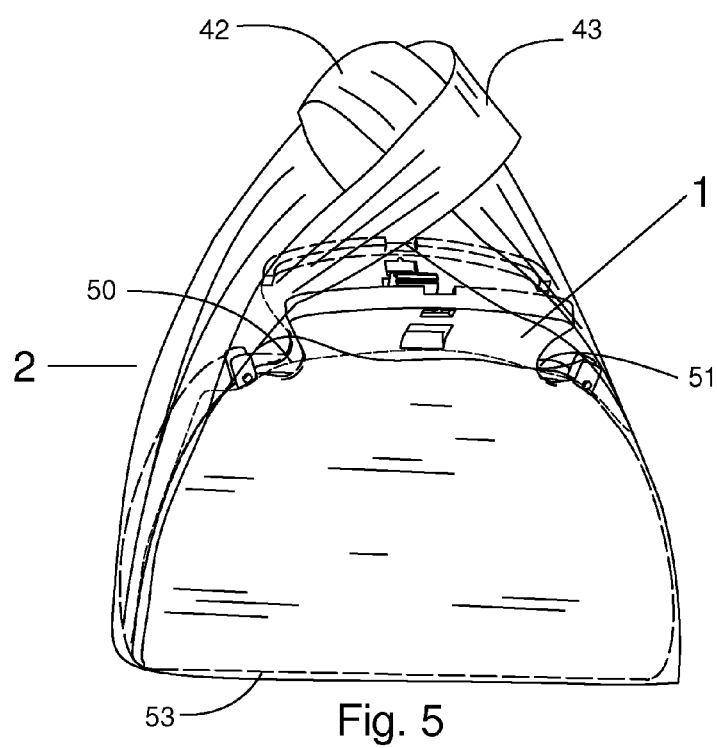
FIG. 5 is a front elevation view of the device of FIG. 4, with side ears of the waste bag overlapping each other in preparation for hooking the side ears over handles on the device.

Referring to FIG. 5, first side ear 42 and a second side ear 43 of waste bag 3 are then crossed over and engaged with first concave side 50 and second concave side 51 of first handle 12 and second handle 104. Device 1, with waste bag 3 attached is now ready for use.

Referring to FIG. 1, (which does not show waste bag 3) device 1 may be carried by strap 36 or may be attached to a dog leash with clasp 37.

Figure 6:
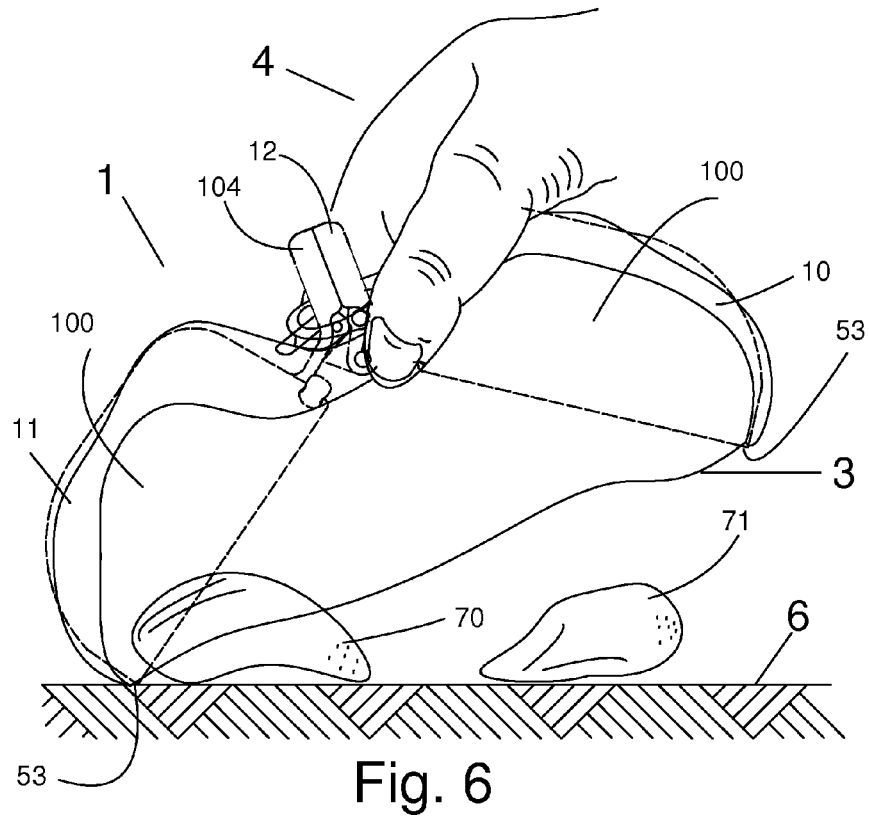
FIG. 6 is a side elevation view of the device of FIG. 5, locked in an open position with the waste bag installed and the device in the process of raking animal waste.

Referring to FIG. 6, there is illustrated a first dog dropping 70 and a second dog dropping 71 resting upon a ground surface 6. It is to be noted that first dog dropping 70 and second dog dropping 71 are spaced from each other. A person 4 using device 1 moves device 1 back to a locked open position, as described above with reference to FIG. 14 and FIG. 17. Movable edge 53 of either first concave body 10 or second concave body 11 may then be used to scrape first dog dropping 70 and second dog dropping 71 into a pile. Person 4 then releases the locking mechanism, as described above with reference to FIG. 16 and FIG. 18. This places person 4 in control of the opening and closing of device 1, by exerting force upon first handle 12 and second handle 104.

Referring to FIG. 7, using a hand 5 the person positions waste collection cavity 100 over first dog dropping 70 and second dog dropping 71 and then releases the force upon first handle 12 and second handle 104. The biasing force of first torsional spring 23 and second torsional spring 26 then causes device 1 to be urged into the closed position with first concave body 10 and second concave body 11 coming together to capture first dog dropping 70 and second dog dropping 71 within waste bag 3.

Referring to FIG. 4 and FIG. 5, First side ear 42 and a second side ear 43 of waste bag 3 are then disengaged from first concave side 50 and second concave side 51. This enables open top 92 of waste bag 3 to be straightened back into the position illustrated in FIG. 3. First side ear 42 and second side ear 43 of waste bag 3 are then tied into a knot to trap first dog dropping 70 and second dog dropping 71 within waste bag 3. Device is then moved to the locked open position, as previously described with reference to FIG. 14 and FIG. 17. Referring to FIG. 2, waste bag 3 can then be disengaged from left hooking post 14 and right hooking post 15 prior to being thrown away.

Variations:

It will be appreciated that hooking posts are not the only means of securing waste bag 3 in place. For example, spring loaded clamps could be used to engage bottom 44 of waste bag 3 in place of the hooking posts that have been described.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. Device for picking up animal waste, comprising in combination:
   a waste bag, comprising:
      a plastic body having an open top, enclosed sides and a bottom;
      at least one attachment strip depending from and positioned along the bottom of the plastic body, the at least one attachment strip having post receiving openings for mounting the waste bag to a pick-up device; and
   a pick-up device, comprising:
      a first concave body and a second concave body, each of the first concave body and the second concave body having an exterior surface and an interior surface, the interior surface of the first concave body and the interior surface of the second concave body collectively forming a waste collection cavity, each of the first concave body and the second concave body having a fixed edge and a movable edge opposed to the fixed edge;
      a hinge along the fixed edge of the first concave body and the second concave body forming a pivot axis allowing relative movement of the first concave body and the second concave between an open position and a closed position, in the open position the movable edge of the first concave body is spaced from the movable edge of the second concave body to permit access to the waste collection cavity;
      a spring biasing the first concave body and the second concave body into the closed position;
      an activation mechanism for overcoming the biasing force of the spring to move the first concave body and the second concave body to the open position; and at least one waste bag retainer comprised of posts positioned on the exterior surface in spaced relation on one of the first concave body or the second concave body adjacent to the hinge, the waste bag being positioned within the waste collection cavity with the posts of the waste bag retainer engaging the post receiving openings on the attachment strip along the bottom of the waste bag and the open top of the waste bag being folded back over the exterior surface of the first concave body and the second concave body.

2. The device of claim 1, wherein the activation mechanism is a first handle on the first concave body and a second handle on the second concave body, such that a manual force applied concurrently to the first handle and the second handle overcomes the biasing force of the spring.

3. The device of claim 2, wherein the first handle and the second handle have concave sides to engage and capture side ear handles on a waste bag.

4. Device for picking up animal waste, comprising in combination:
 a waste bag, comprising:
  a plastic body having an open top, enclosed sides and a bottom;
 a pick-up device, comprising:
  a first concave body and a second concave body, each of the first concave body and the second concave body having an exterior surface and an interior surface, the interior surface of the first concave body and the interior surface of the second concave body collectively forming a waste collection cavity, each of the first concave body and the second concave body having a fixed edge and a movable edge opposed to the fixed edge;
  a hinge along the fixed edge of the first concave body and the second concave body forming a pivot axis allowing relative movement of the first concave body and the second concave between an open position and a closed position, in the open position the movable edge of the first concave body is spaced from the movable edge of the second concave body to permit access to the waste collection cavity;
  a spring biasing the first concave body and the second concave body into the closed position;
  an activation mechanism for overcoming the biasing force of the spring to move the first concave body and the second concave body to the open position; and
  at least one waste bag retainer on one of the first concave body or the second concave body adjacent to the hinge, the waste bag being positioned within the waste collection cavity with the waste bag retainer engaging the bottom of the waste bag and the open top of the waste bag being folded back over the exterior surface of the first concave body and the second concave body; and
  a locking mechanism to lock the first concave body and the second concave body into the open position.

* * * * *